UNITED STATES PATENT OFFICE.

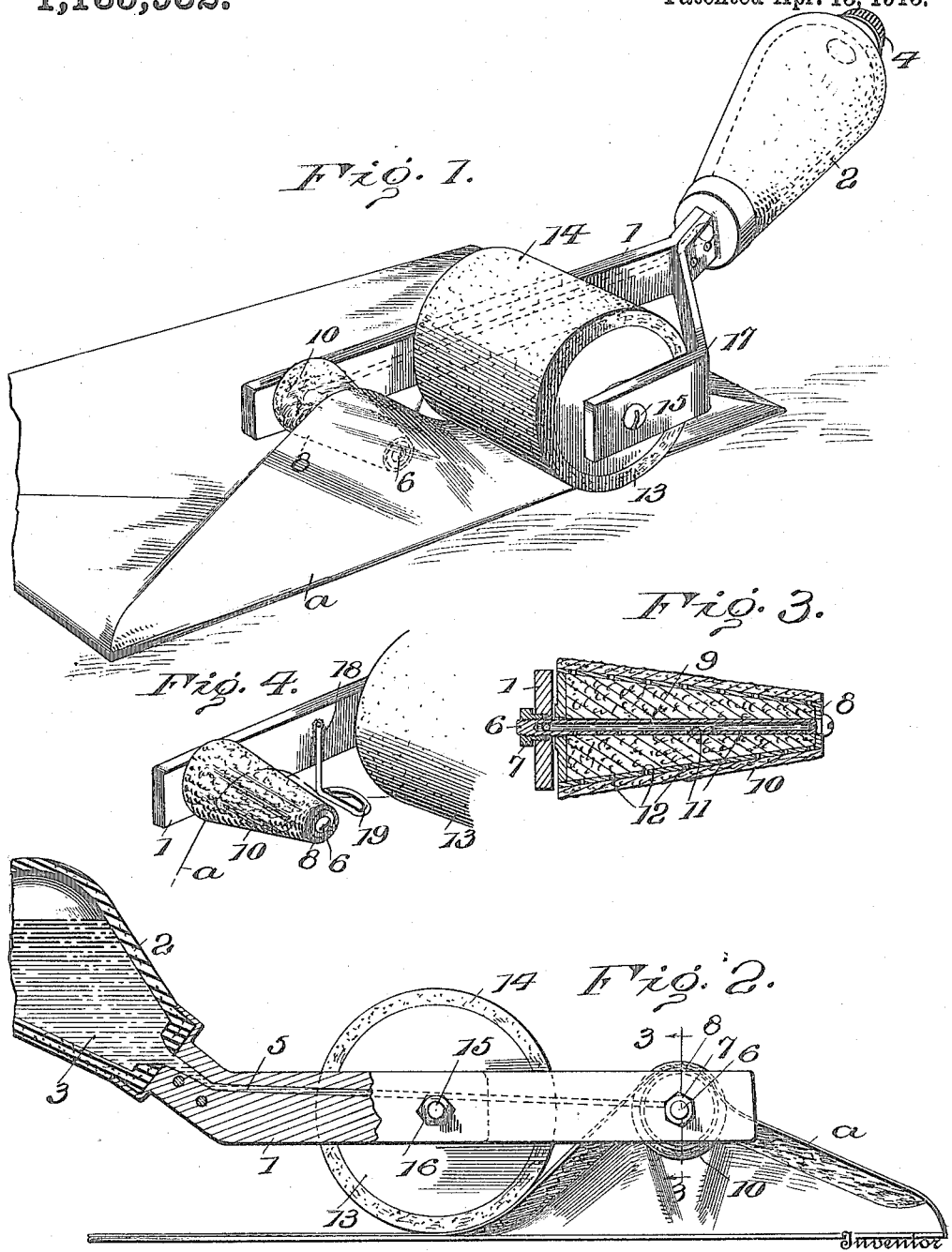

MICHAEL V. AHERN, OF NORFOLK, VIRGINIA, ASSIGNOR OF ONE-HALF TO FREDERICK DAWKINS, OF NORFOLK, VIRGINIA.

DEVICE FOR SEALING ENVELOPS.

1,135,932.  Specification of Letters Patent.  Patented Apr. 13, 1915.

Application filed May 20, 1914. Serial No. 839,726.

*To all whom it may concern:*

Be it known that I, MICHAEL V. AHERN, a citizen of the United States, residing at Norfolk, in the county of Norfolk and State of Virginia, have invented certain new and useful Improvements in Devices for Sealing Envelops, of which the following is a specification.

This invention relates to devices for moistening and sealing envelops and similar articles having a gummed closure or sealing flap and the object is to provide a manually operated moistener and sealer which can be manufactured at small cost and which will do efficient service.

The nature, characteristic features and scope of the invention will more readily be understood from the following description taken in connection with the accompanying drawing, forming a part hereof, wherein—

Figure 1 is a perspective view of my improved moistener and sealer, and the manner of applying same. Fig. 2 is a sectional-elevational view of the device. Fig. 3 is a section on line 3—3 of Fig. 2; and Fig. 4 is a detail of a modification.

In the drawing, the numeral 1 designates an elongated rigid metal support or shaft designed as a carrying means for a wetting or moistening roller and for a follower or sealing roller. The shaft has a grasping handle 2, which is tilted or directed upwardly and formed hollow so as to constitute a fluid reservoir 3, the fluid being supplied thereto through a suitable opening in the top which is closed by a cap or nozzle 4. The reservoir may feed the moistening device in any suitable manner. In the present embodiment there is a duct or fluid passage 5 in the shaft through which fluid is conveyed from the handle to a tubular pin or rivet 6 secured near the forward end of the shaft by a threaded nut or collar 7. The element 6 constitutes the axis or spindle of a hollow cone roller 8. It is evident of course that the spindle is fixed and that the roller turns thereon, but the two are quickly detachable by means of the aforesaid nut or collar 7. Internally the cone may be provided with an absorbent filler, such as sponge, indicated at 9, and externally it is equipped with a sheath or blanket 10, as of felt or other appropriate material. The spindle and cone are perforated as at 11 and 12 so that fluid, such as water, may pass to the wetting surface or blanket 10.

The peculiar shape of the wetting roller enables it to readily take under or lift the flap *a* of an envelop and moisten the gummed surface thereof as indicated in Figs. 1 and 2. The numeral 13 designates a follower or compression and sealing roller the function of which is to press the moistened flap to place and thus complete the sealing. The element shown is a comparatively heavy cylindrical roller, which may, if desired, be equipped with a blotting or absorbent surface 14, which when present operates to take up any excess moisture and thus make for rapid drying and sealing. The roller 13 is carried by a spindle 15, one end of which is fixed in the shaft 1 as by a nut or collar 16, and the other end of which is mounted in an arm 17 rigidly secured to the shaft.

If desired I may employ means intermediate the rollers for insuring the proper guiding of the flap in advance of the sealing. Such provision is illustrated in Fig. 4, which shows a flap guide or hold-fast, which is preferably constructed of spring wire so as to provide for more or less resilience. It consists of a base 18, which may be soldered to the shaft, and a doubled or loop portion 19, bent at substantially a right angle to the base so as to bear upon the flap in the wake of the cone or wetting roller.

It will be obvious to those skilled in the art to which my invention relates that modifications may be made in details without departing from the spirit and scope thereof. Hence the invention is not limited other than required by the state of the prior art.

Having described the nature and object of my invention what I claim as new and desire to secure by Letters Patent is:—

1. The combination of a support, a handle attached thereto and constituting a fluid reservoir, a cone shape wetting roller journaled near the forward end of the support, a follower or sealing roller, and a fluid supply connection between the reservoir and the wetting roller.

2. The combination with a support equipped with laterally projecting journals and with a handle constituting a fluid reservoir, a cone shape roller mounted on the forward journal and equipped with a wetting surface designed to moisten the flap, a weighted cylindrical roller mounted on the other journal and designed to compress the moistened flap and equipped with means for removing excess moisture, and a fluid supply connection intermediate the reservoir and wetting roller.

3. The combination with a support equipped with laterally projecting journals and with a handle constituting a fluid reservoir, a cone shape roller mounted on the forward journal and equipped with a wetting surface designed to moisten the flap, a weighted cylindrical roller mounted on the other journal and designed to compress the moistened flap and equipped with means for removing excess moisture, flap guiding and holding means intermediate the rollers, and a fluid supply connection intermediate the reservoir and the wetting roller.

4. The combination of a support equipped with laterally projecting journals and with a suitable handle, a hollow cone shape wetting roller mounted on the forward journal with its smaller diameter at the support end of the journal, a complemental compression or sealing roller mounted on the other journal, and means for supplying fluid to the wetting roller.

In testimony whereof I affix my signature in presence of two witnesses.

MICHAEL V. AHERN.

Witnesses:
SHERWOOD FORREST,
FREDERICK DAWKINS.

Copies of this patent may be obtained for five cents each, by addressing the "Commissioner of Patents, Washington, D. C."